US006957349B1

(12) United States Patent
Yasukura

(10) Patent No.: US 6,957,349 B1
(45) Date of Patent: Oct. 18, 2005

(54) METHOD FOR SECURING SAFETY OF ELECTRONIC INFORMATION

(76) Inventor: Yutaka Yasukura, 11-13-506, Hatagaya 1-chome, Shibuya-ku, Tokyo-to 151-0072 (JP)

( * ) Notice: Subject to any disclaimer, the term of this patent is extended or adjusted under 35 U.S.C. 154(b) by 0 days.

(21) Appl. No.: 09/889,160

(22) PCT Filed: Mar. 18, 1999

(86) PCT No.: PCT/JP99/01350

§ 371 (c)(1),
(2), (4) Date: Jul. 11, 2001

(87) PCT Pub. No.: WO00/45358

PCT Pub. Date: Aug. 3, 2000

(30) Foreign Application Priority Data

Jan. 28, 1999 (JP) .................................. 11-019399

(51) Int. Cl.[7] .................... G06F 11/30; G06F 12/14; H04L 9/00; H04L 9/32
(52) U.S. Cl. ..................... 713/201; 713/200; 380/216; 380/229
(58) Field of Search ............... 713/200, 201; 380/216, 229

(56) References Cited

U.S. PATENT DOCUMENTS

| 4,933,969 A | | 6/1990 | Marshall et al. |
| 5,058,162 A | * | 10/1991 | Santon et al. .................. 705/51 |
| 5,161,072 A | * | 11/1992 | Ai ................................ 360/53 |
| 5,757,922 A | * | 5/1998 | Shiroshita .................... 380/42 |
| 5,903,734 A | * | 5/1999 | Chida .......................... 709/232 |

FOREIGN PATENT DOCUMENTS

| DE | 2641337 A | 3/1978 |
| JP | 60-247683 A | 12/1985 |
| JP | 60247683 | 12/1985 |
| JP | 61-107375 A | 5/1986 |
| JP | 61107375 | 5/1986 |
| JP | 62-72243 A | 4/1987 |
| JP | 63-255840 A | 9/1988 |
| JP | 63225840 | 9/1988 |
| JP | 2-259689 A | 10/1990 |
| JP | 3-151738 A | 6/1991 |
| JP | 3151738 | 6/1991 |
| JP | 8-185376 A | 7/1996 |
| JP | 10-91705 A | 4/1998 |
| WO | WO 00/64096 | 10/2000 |

OTHER PUBLICATIONS

A. Menezes et al. "Handbook for Applied Crytography" 1996 CRC Press XP002246921, ISBN: 0-8493-8523-7, pp. 543-550.

* cited by examiner

Primary Examiner—Gilberto Barrón, Jr.
Assistant Examiner—Venkat Perungavoor
(74) Attorney, Agent, or Firm—Fleshner & Kim, LLP

(57) ABSTRACT

A security assurance technique for electronic information wherein an electronic information file 1 is divided into a plurality of information elements 2 and the divided information elements are selected and combined with their order changed to produce one or more information blocks 3, and division extraction data of the information elements is produced and the information blocks are formed and stored or transmitted, whereafter, when the electronic information is to be utilized, the information elements 4 included in the information blocks 3 are re-divided, re-arranged in the correct order and integrated based on the division extraction data to restore an original electronic information file 5, whereby, even if electronic information stored or being communicated is stolen, the value of the information is reduced to disable utilization of the information.

14 Claims, 9 Drawing Sheets

FIG.1
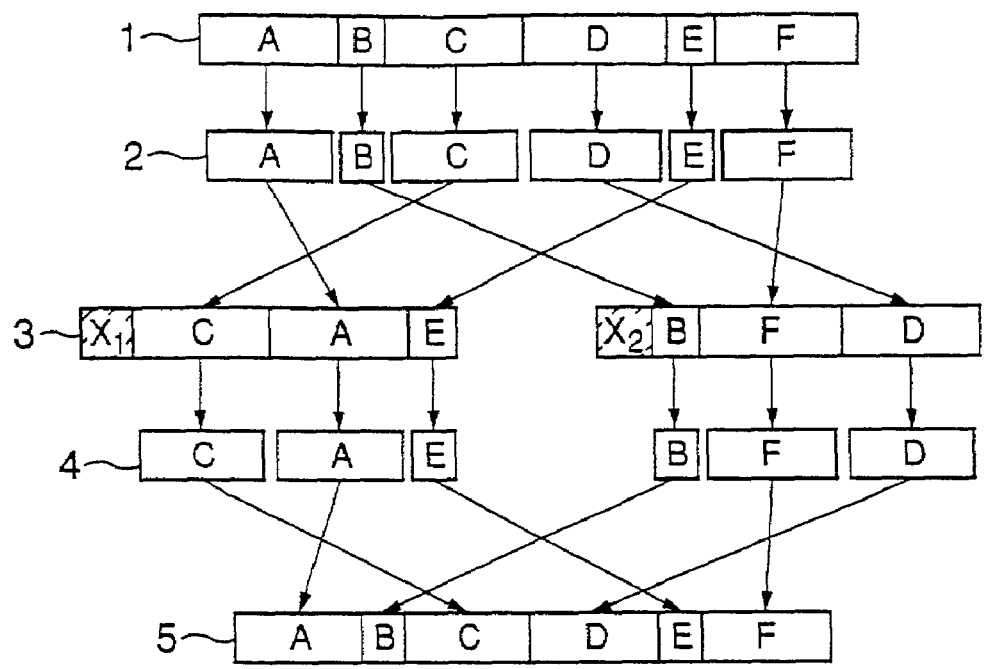
FIG.2
(a)
(b)
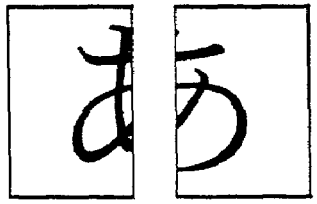

FIG. 5

ORIGINATOR

- PREPARE COPY FROM ORIGINAL ELECTRONIC INFORMATION FILE — S21
- STORE COPY (OR ORIGINAL) — S22
- FORM BLOCKS FROM ORIGINAL (OR COPY) BASED ON DIVISION INFORMATION AND EXTRACTION INFORMATION — S23
- SEND BLOCKS TO TRANSFER AUTHORITIES — S24

TRANSFER AUTHORITY

- TRANSFER BLOCKS TO RECIPIENT — S25

RECIPIENT

- COLLECT NECESSARY BLOCKS — S26
- EXTRACT ELEMENTS IN BLOCKS BASE ON EXTRACTION INFORMATION AND DIVISION INFORMATION AND INTEGRATE ELEMENTS TO FORM ELECTRONIC INFORMATION FILE — S27
- PREPARE COPY OF ELECTRONIC INFORMATION FILE — S28
- SEND BACK COPY THROUGH TRANSFER AUTHORITIES — S29

ORIGINATOR

- VERIFY SENT BACK COPY WITH STORED COPY OF ORIGINAL — S30
- TRANSMIT WARNING NOTIFICATION TO RECIPIENT WHEN TWO COPIES DO NOT COINCIDE — S31

RECIPIENT

- IT CAN BE DETERMINED THAT ELECTRONIC INFORMATION FILE HAS BEEN RESTORED SUCCESSFULLY IF NO NOTIFICATION IS RECEIVED — S32

METHOD FOR SECURING SAFETY OF ELECTRONIC INFORMATION

This application claims priority to PCT/JP99/01350, filed Mar. 18, 1999, which published on Aug. 3, 2000 with Publication No. WO00/45358 in the Japanese language and which claimed priority to Japanese Application No. 11-19399, filed Jan. 28, 1999.

TECHNICAL FIELD

This invention relates to a method for securing safety of electronic information in storage of electronic information or in exchange of electronic information and also to a method of securing the identity with an original of electronic information.

BACKGROUND ART

A large number of computers have been and are being connected to a communication network to form a system such that each of the computers can be connected to many and unspecified persons over a communication path. Therefore, there is the possibility that also electronic information stored in an external storage apparatus of a computer such as a hard disk apparatus may be accessed by a third party having no authority over a communication path and stolen or altered.

Also transmission of electronic information over a communication path such as exchange of personal information by an electronic mail and so forth, distribution of an application program such as a game program or a business program or distribution of data extracted from a database and edited has been and is increasing. Where communication environments open to the outside are used for such electronic information exchange, there is the possibility that a third party who is not a receiving party may acquire electronic information being communicated through an intercepting or stealing action and utilize the electronic information. Particularly where information is distributed for pay or information relating to privacy is transmitted, it is necessary to take a countermeasure so that electronic information being communicated may not be stolen readily.

In order to disable utilization of electronic information by a third party having no relation even if the third party acquires the electronic information, a method is used to assure the secrecy of electronic information through encipherment of the electronic information. Encipherment techniques developed for the object just described include various systems such as encipherment systems which use a symmetrical key and another encipherment systems which use an asymmetrical key.

However, even if such encipherment techniques are used, since stored electronic information or electronic information being transmitted includes all information, if someone acquires a decipherment method through some means such as deciphering of the cipher, then the person can decipher the cipher readily to acquire the useful information. Also alteration or counterfeiting is possible, and attention must always be paid to whether or not information extracted or received keeps true and correct information. Particularly where electronic information for which high security is required such as authentication information of the person itself is stored or transmitted, the conventional methods are not free from anxiety.

If information stored or being communicated is subject to alteration or missing, then most of the information extracted or received cannot be utilized correctly, and use of the incorrect information as it is may give rise to some trouble. Also the fact itself that information is known to a third party sometimes matters. Accordingly, a convenient technique for confirming that received electronic information has the identity with that which has been forwarded and for confirming that electronic information is used legally is demanded.

Therefore, it is an object of the present invention to provide a technique of assuring the security of electronic information by working electronic information to be stored or transmitted so that, even if the electronic information stored or being transmitted is stolen, it cannot be utilized thereby to decrease the value of the information and to provide a method of assuring the genuineness of information which a user has extracted or received to restore.

DISCLOSURE OF THE INVENTION

A security assurance method for electronic information of the present invention is characterized in that an electronic information file is divided into a plurality of information elements, and the divided information elements are selected and combined with their order changed to produce one or more information blocks. The information blocks are produced such that, if all of the information blocks are not integrated, then all of the information elements are not included. Further, division extraction data in which division information of the information elements and formation information of the information blocks are recorded is produced, and part of the information blocks and the division extraction data is transmitted to and stored into a certification station. Meanwhile, the other parts are stored or transmitted separately. Then, when the genuineness of the electronic information is to be confirmed, all of the information blocks and the division extraction data including the part stored in the certification station are collected and the information blocks are re-divided into the original information elements, re-arranged in the correct order and integrated based on the division extraction data to restore the original electronic information file. According to the security assurance method for electronic information of the present invention, part of information is deposited to the certification station and, when the original information is required, the information block in hand and the information block owned by the other party as well as the information block deposited to the certification station are joined to restore the information. Accordingly, even if one of the parties concerned and the certification station alters its information, the fact of the alteration is found clearly, and since the information stored by the certification station is not the entire information but part of the information, the information capacity required for the certification station may be small. Further, since the function of authenticating the security of information is divided into the three parties, it is an advantage in administration of the certification station that the burden on the certification station is light.

It is to be noted that the division extraction data may be stored or transmitted separately, and the division extraction data relating to the information elements may be produced and annexed for each of the information elements.

According to the security assurance method for electronic information of the present invention, an electronic information file to be stored or sent is divided into a suitable number of information elements of suitable lengths and then shuffled and combined to produce one or more information blocks, and the information blocks are stored into an external storage apparatus or sent to a recipient.

Accordingly, since the electronic information stored or being communicated are in a state wherein it is not useful unless it is restored like paper information broken by a shredder, even if a third party who does not have restoration means accesses the electronic information, the electronic information is not leaked as valuable information, and therefore, it is secure.

Also where only one information block is formed for an electronic information file, since the order of the information elements placed in the information block is different, it is difficult to read or discriminate the information. However, where a plurality of information blocks are formed and stored or sent separately from each other, then even if a third party steals one of the information blocks, the entire contents of the electronic information are not stolen, and consequently, naturally the security is improved further.

Also it is possible to apply a cipher technique to store or send the information blocks to achieve further improvement of the security.

The division extraction data is data necessary for division and combination used when the information blocks are formed, and is stored or sent together with the information blocks. Since the division extraction data includes position information and length information of each information element in the electronic information file, it may be annexed to each information element and handled together with an information block. Further, where the importance is attached to the security, the division extraction data may be handled separately from the information blocks.

A person who extracts or receives the electronic information collects all of the information blocks and uses the division extraction data to separate the information elements included in the individual information blocks and re-couple the information elements in the correct order to restore the original electronic information.

When the electronic information is to be stored into an external storage apparatus of a computer, information blocks and division extraction data may be produced by processing the electronic information file in such a manner as described above and stored into the external apparatus.

Where the security assurance method of the present invention is applied to a storage apparatus, even if the storage apparatus is accessed by a third party, this does not lead to leakage of valuable information, and the security in storage of electronic information by the computer is improved.

It is to be noted that, where electronic information is to be sent, preferably an electronic information file is divided into a plurality of information elements and the divided information elements are selected and combined to produce a plurality of information blocks, and then the information blocks are transmitted in a separate condition from each other to a recipient and division extraction data is transmitted to the recipient along with the separated information blocks, whereafter the recipient side receiving the data re-divides and integrates the information elements included in the information blocks into the correct order based on the division extraction data to restore the original electronic information.

When an electronic information file is to be sent, preferably it has a higher degree of security because a communication path used is sometimes widely open to the public. Also in such an instance, where a plurality of information blocks are sent by different communication means, a considerably high degree of security can be assured.

Since the information blocks in the present invention individually carry mere part of necessary information, even if some information block is acquired during communication, the entire information cannot be restored.

Accordingly, preferably at least one of the information blocks and the division extraction data is transmitted to the recipient by second transmission means different from the transmission means for the other electronic information.

Where all of the information blocks and the division extraction data are not sent using the same transmission means but some of them are transmitted by different transmission means, even if a thief is present midway of a communication path, it cannot collect all information, and this provides a higher degree of security.

If the information blocks are sent at different points of time from each other or sent using different communication routes from each other, then it is very difficult to steal all information blocks without a miss on the way of the communication path, and only part of the information can be acquired to the utmost. Therefore, even when authentication data of the person itself is sent, it can be prevented that a third party steals the authentication data.

It is to be noted that preferably the division extraction data includes data for confirmation of the originality of the electronic information file. The identity between the electronic information file which has been intended to be sent and the electronic information restored by the recipient can be confirmed with a high degree of certainty by verifying the fact that the division extraction data and contents of the received information blocks are consistent.

Further, the identity between the electronic information file which has been intended to be sent and the electronic information restored by the recipient may be confirmed by placing an information element selected from among the information elements, that is, a key element, into information blocks to be sent along different communication routes so that the key element may be included commonly and verifying, when the information elements are to be integrated, the identity between the key elements included in an overlapping relationship in the received information blocks.

It is to be noted that, in order to confirm that the electronic information sent is identical with the electronic information file which has been intended to be sent, also a simple method of checking whether or not the number of words included in the individual files coincide with each other is applicable.

If the security assurance method for electronic information of the present invention is used for on-line sales of an application program or a database, then even if any other person than a legal purchaser steals electronic information being communicated, only part of the information can be acquired, and consequently, the program cannot be executed or useful information cannot be acquired. Accordingly, since there is no motivation of stealing electronic information being communicated, the merit to the selling party is not damaged by theft.

Further, if the security assurance method for electronic information of the present invention is applied to send authentication data of the person itself, then information exchange with a high degree of security can be achieved while theft or forgery by a third party is prevented with certainty.

If further strict assurance is required, preferably the original of electronic information to be sent is stored, and electronic information restored by the recipient side is sent back and verified with the original of the electronic information to confirm the identity.

Furthermore, if the electronic information restored by the recipient is sent back and verified with the stored original of the electronic information to confirm the identity, then even when the electronic information is altered during communication or misses partly, this can be discriminated immediately to take a countermeasure.

It is to be noted that the information blocks acquired by the recipient may be sent back as they are and verified with the original of the electronic information. If inspection is performed for each of the information blocks, then a damaged portion can be specified, and this facilitates a countermeasure.

If a difference from the original is detected, then considering the reliability of the communication path doubtful, the information may be sent again or the communication path may be changed to prevent interference of a person who has altered the information. It is to be noted that also the recipient can utilize the electronic information with confidence when a result of the verification is received from the transmitting person.

The reliability is improved if a transfer station or so called transfer authority which is neutral and impartial is interposed in the transmission means so that information transmission may be performed through the transfer station. The transfer station transfers an information block included in an information package sent thereto to the recipient based on address information.

Where such a route as described above is used to send the information blocks, since the appearances of the divided information blocks are different from each other, it is difficult for a thief midway of the communication path to collect all information blocks necessary to restore the electronic information file, and the security is further improved.

Particularly, even if only a portion including the division extraction data is sent through the transfer station, the reliability of the entire system is improved.

It is to be noted that, if the transfer station applies a cipher technique to transfer the electronic information, then a higher degree of security can be assured.

Further, the transmitted information may not necessarily be used immediately by the recipient. Therefore, the transfer station may keep the information blocks sent by the transmitting party such that the recipient may cause the transfer station to transmit the information blocks when necessary so that it may integrate the collected information blocks to restore and utilize the electronic information.

BRIEF DESCRIPTION OF THE DRAWINGS

FIG. 1 is a block diagram illustrating a concept of a security assurance method for electronic information of the present invention;

FIG. 2 is a view illustrating an operation of the present invention;

FIG. 5 is a flow diagram illustrating a second embodiment of the security assurance method for electronic information of the present invention;

BEST MODE FOR CARRYING OUT THE INVENTION

Figure 3:
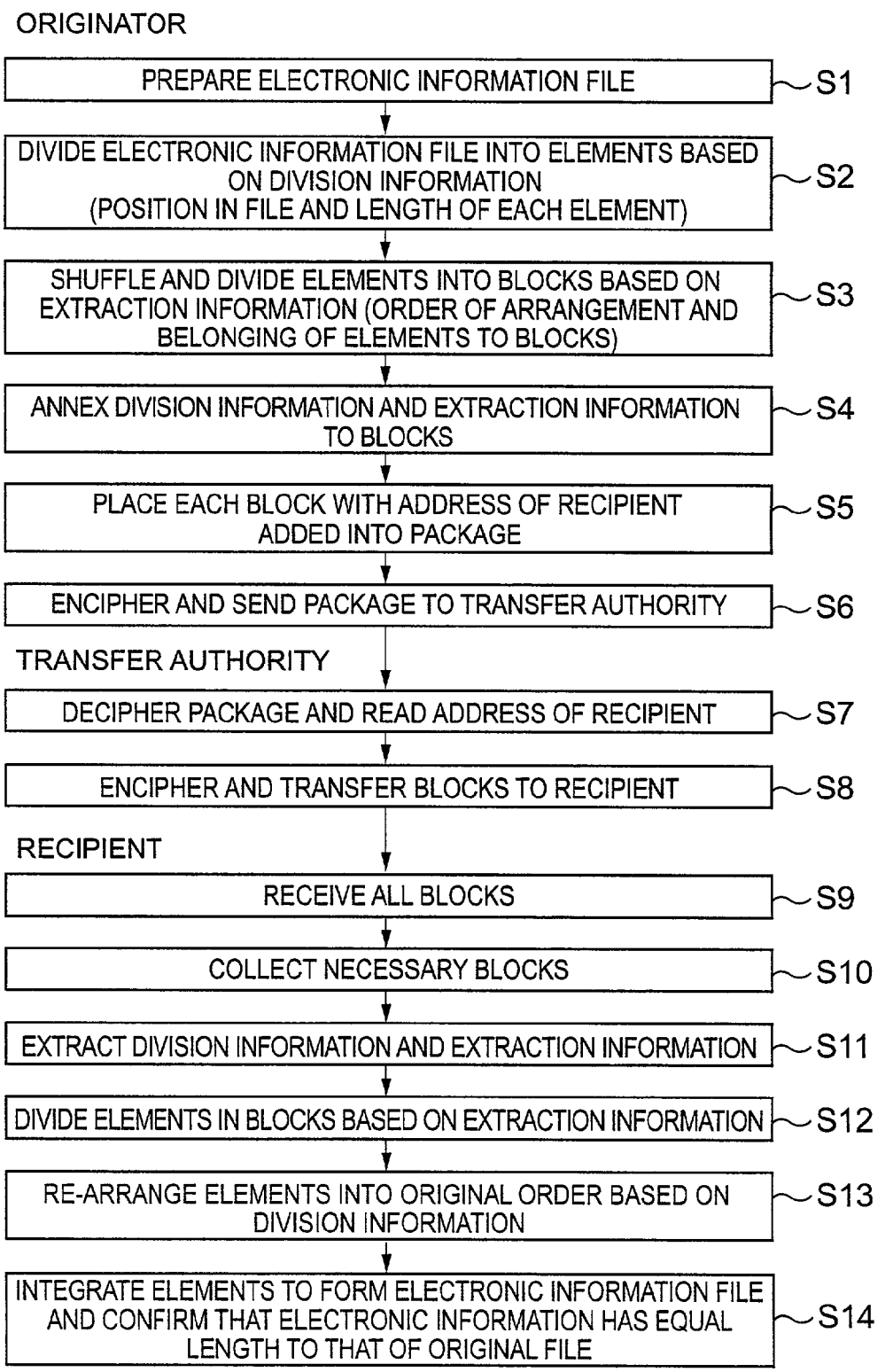
FIG. 3 is a flow diagram illustrating a first embodiment of the security assurance method for electronic information of the present invention.

The security assurance method for electronic information of the present invention is a method of making the security of electronic information certain in storage or communication of an electronic information file. According to the method of the present invention, even if someone steals electronic information during storage or during communication, the value of the information which can be acquired by theft is reduced to prevent damage by the theft and the gain of the theft is reduced to prevent a stealing action. Further, if missing of information or alteration to information occurs during communication, then this fact is detected thereby to assure the security.

In the following, details of the present invention are described with reference to the drawings.

FIG. 1 is a block diagram illustrating a concept of the present invention, and FIG. 2 is a view illustrating an operation of the present invention. FIG. 1 illustrates, as an example of form of use of the present invention, a case wherein an electronic information file is divided into six information elements and divided into two information blocks.

In the security assurance method for electronic information of the present invention, an object electronic information file 1 is divided into a suitable number of information elements 2. Here, for simplification, a case wherein the electronic information file 1 is divided into six information elements A, B, C, D, E and F is described as an example. The information elements 2 need not be divided at a position at which they have significance as information, and in order to reduce the possibility of stealing, preferably the information elements 2 are obtained by merely dividing the electronic information file 1 physically.

The order of arrangement of the information elements A, B, C, D, E and F obtained by the division is changed and they are grouped suitably to form a suitable number of information blocks 3.

In the example shown, the information elements A, D and E are distributed in the first information block 3, and the information elements B, C and F are distributed in the second information block 3. It is to be noted that also the order of arrangement of the information elements in each information block 3 can be changed arbitrarily.

Even if such information blocks 3 are read out by a third party, since the information elements A, B, C, . . . are not arranged in a significant arrangement, contents of the electronic information cannot be read if they remain as they are.

Further, since the electronic information is in a divided state, the contents of it cannot be restored if all of the information blocks are not acquired. For example, if authentication data of the person itself illustrated in (a) of FIG. 2 is divided as seen in (b) of FIG. 2, then even if one of the information blocks is acquired and the information is restored successfully, the information cannot be used as authentication data. Therefore, even if someone accesses the electronic information illegally, it is not easy to make it possible to utilize the electronic information, and the security of the information can be assured.

The information blocks 3 are stored into a storage apparatus or sent to a recipient in accordance with an object.

A user of the electronic information divides the information blocks 3 acquired from the storage or received from the transmitting person into original information elements 4 (A, B, C, . . . ) and re-arranges the information elements 4 into a correct order to form a usable electronic information file 5 thereby to restore the original electronic information file 1.

Basic information necessary to restore the electronic information file 1 is division information of the information elements A, B, C, . . . included in the information blocks 3 and information of the position and the length of each information element in the electronic information file 1.

After all of the information blocks 3 relating to the object electronic information file 1 are collected, the information elements in the information blocks 3 can be cut out and re-arranged into a correct order using the information of the top address and the word length of each of the information elements 2.

Further, when the electronic information file 1 is to be restored, information for specifying the object electronic information file 1 or information of the order of arrangement of information elements included in each block when the information elements 2 are re-arranged to form the information blocks 3 may be utilized.

In order to restore the electronic information file 1, it is required first to confirm that the collected information blocks 3 relate to the object electronic information file 1 and that all relating information blocks have been collected without a miss. In this instance, the operation can be performed efficiently if an identification region X1 or X2 is annexed to an information block or an information element and ID information for specifying the electronic information file 1 is stored in and used together with the identification region.

Further, the electronic information file 5 obtained by re-dividing the information elements included in each block using division information and re-arranging them in accordance with the order of arrangement of the divided information elements 4 is the same as the electronic information file 1.

It is to be noted that whether or not the restored electronic information file 5 and the original electronic information file 1 are same as each other can be verified with a certain degree of certainty, for example, by comparing the total word lengths of the two with each other.

Division extraction data including such basic information is produced when the information blocks 3 are produced and stored or sent with an identification region annexed to part of the information blocks 3 and then utilized to restore the electronic information file 1. The division extraction data may be annexed for each information element.

It is to be noted that the division extraction data may be stored or sent separately from and independently of the information blocks 3.

According to the security assurance method for electronic information of the present invention, the number of the information blocks 3 corresponding to the single electronic information file 1 is not limited to two but may be a plural number equal to or greater than three or may be one. Since, in any case, the arrangement of information elements in each information block 3 is different from the original arrangement, a third party cannot read out and utilize the electronic information. Consequently, the security of the electronic information can be assured.

Embodiment 1

In the first embodiment, the security assurance method for electronic information of the present invention is applied to transmission of an electronic information file securely to the other party using a communication path.

Figure 4:
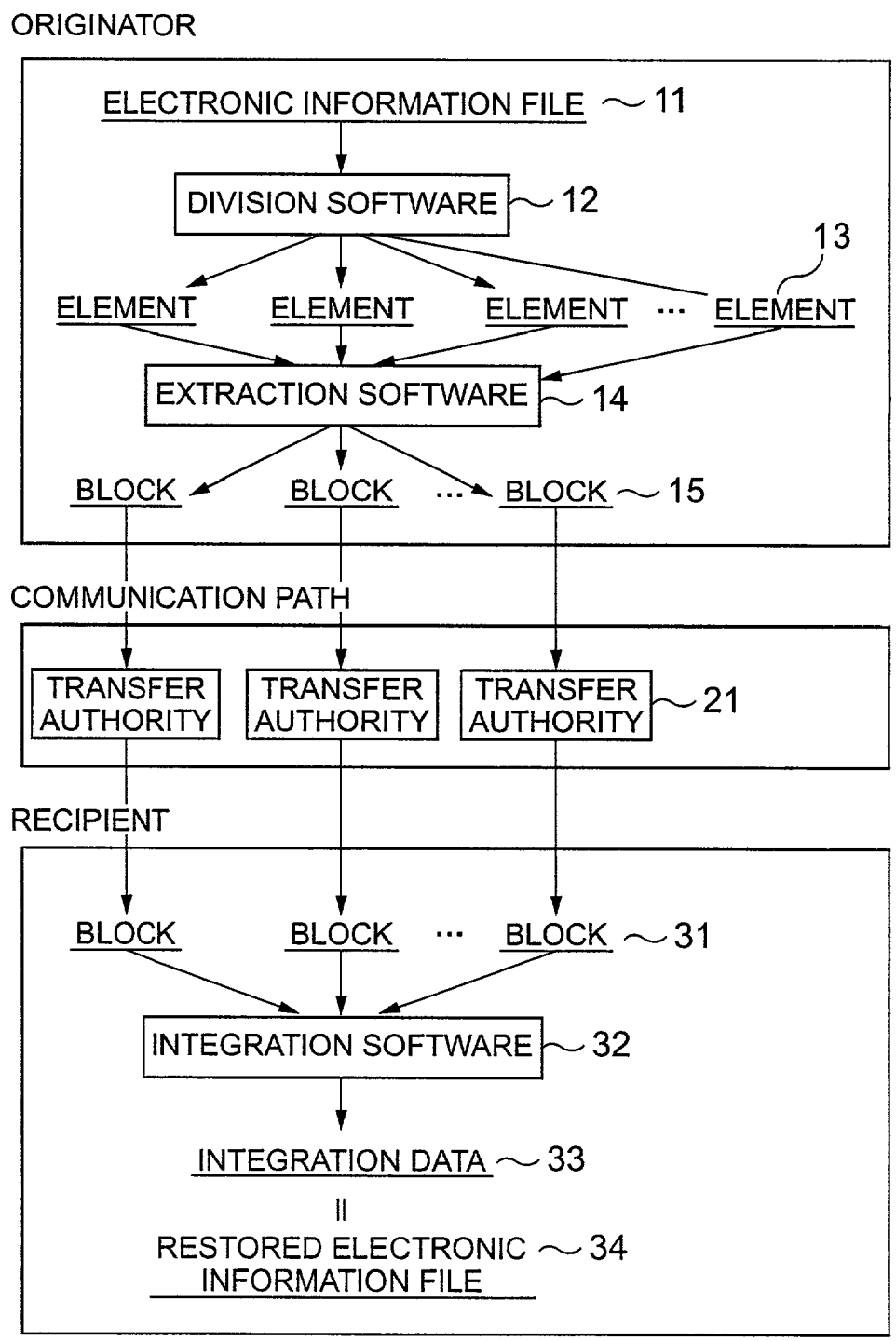
FIG. 4 is a block diagram of a system which uses the present embodiment.

FIG. 3 is a flow diagram illustrating the present embodiment, and FIG. 4 is a block diagram of a system which uses the present embodiment.

First, a basic form of the present embodiment is described with reference to FIGS. 3 and 4.

An originator of electronic information first prepares newly or extracts from a database and edits electronic information to be transmitted to prepare an electronic information file 11 (S1). An example of subject electronic information is electronic information for which high security is required such as authentication data of the person itself or valuable electronic information such as software which is sold over a communication path.

Then, division software 12 is used to divide the electronic information file 11 into a plurality of information elements 13 (S12). To the division software 12, the division position of each of the information elements 13 in the electronic information file 11 and the word length of the information element can be indicated.

It is to be noted, instead of indicating the division position and the word length of each information element, the division software 12 itself may determine the division position and the word length if the number of divisions is designated. Although the division number can be determined arbitrarily, where electronic information up to approximately 100 kBytes is an object, it may be determined that a number, for example, equal to or smaller than 100 is selected.

Then, extraction software 14 is used to distribute the information elements 13 into a plurality of information blocks 15 (S3). The extraction software 14 has a function of re-arranging the divided information elements 13 into a different order and another function of distributing the information elements 13 into the information blocks 15. An operator can indicate the number of information blocks.

Further, the division information and a result of the re-arrangement of the information elements 13 are converted into division extraction data of the electronic information and individually annexed to the information elements 13. The division extraction data of all of the information elements 13 distributed to the information blocks 15 may be annexed collectively in the identification regions X1 and X2 of the information blocks 15 (S4).

It is to be noted that the identification regions X1 and X2 may include data regarding an originator and a recipient, data regarding electronic information such as its preparing person and its owner, data which describes a range within which the electronic information can be utilized such as an authorized user or a term of validity, data for specifying software to be applied such as integration software and so forth.

Further, if an ID which indicates electronic information is described in an identification region, then since this facilitates assorting of information blocks, this is convenient to collect information blocks relating to object electronic information in order for a recipient to re-integrate the information blocks to restore an electronic information file.

It is to be noted that the division extraction data may be sent to the recipient separately from and independently of the information blocks. Further, instead of annexing the division extraction data discretely to the information blocks, the division extraction data may be annexed collectively to one of the information blocks. Furthermore, the division extraction data regarding the entire electronic information file may be annexed to all of the information blocks.

Then, the information blocks 15 are individually placed into packages to be transmitted to transfer stations 21 (S5). In each of the packages, the address of a person to receive the package finally is placed. The packages are enciphered and sent to the transfer stations 21 (S6). The encipherment processing may be performed applying a suitable known method.

In this instance, different destinations can be selected for the individual packages. Communication means to be used is selected based on the degree of security which depends upon the risk of a communication path and the characteristic of the electronic information. Where leakage or alteration should be minimized, a number of communication means as great as possible are used.

It is to be noted that, when the risk of leakage of information is low, an ordinary communication path in which no transfer station is present may be used. Since the security assurance method of the present invention has a high degree of security because it places electronic information into communication paths in a divided and re-arranged state, even if an ordinary communication path is used, the security assurance method provides a sufficiently high degree of security when compared with conventional methods.

Further, as communication means, for example, a method of using a mail to send a portable storage device such as a floppy disk or a like method may be selected.

Each of the transfer stations 21 receiving a package deciphers the package to read the destination information placed in the package (S7).

Further, the transfer station 21 enciphers the information blocks placed in the package again and sends them to the indicated recipient (S8).

Since the information blocks 15 are distributed in a state wherein contents thereof cannot be discriminated from their appearance to different transfer stations in this manner, even if a third party can acquire the electronic information present in the communication path, it is difficult for the third party to discriminate and collect necessary information, and the third party cannot restore the object electronic information.

The recipient receives and deciphers information blocks 31 sent from the transfer stations (S9) and then searches the information blocks or the identification region portions of the information elements to collect all of the information blocks 31 required to restore the object electronic information (S10).

Further, the recipient extracts the division information used when the information elements 13 are produced and the extraction information used when the information blocks 15 are produced from the division extraction data of the identification region portions (S11).

Then, the recipient re-divides the information blocks 31 based on the division information and the extraction information to cut out the original information elements 13 (S12) and re-arranges the information elements 13 into the original order using integration software 32 (S13).

Finally, the recipient integrates all of the information elements to form an electronic information file 33. In this instance, the recipient compares the total length of the electronic information file 33 formed by the integration with the total length value of the original file included in the division extraction data (S14). If they coincide with each other, then it can be determined that the original electronic information file 11 has been regenerated successfully with a considerably high degree of probability. Further, it is also possible to use information which describes a characteristic of the original or position information in which a suitable bookmark is inserted in order to confirm the identity with the original with a higher degree of accuracy.

Embodiment 2

In the second embodiment, the electronic information security assurance method of the present invention is provided with means for assuring the originality of electronic information with a higher degree of reliability.

Figure 6:
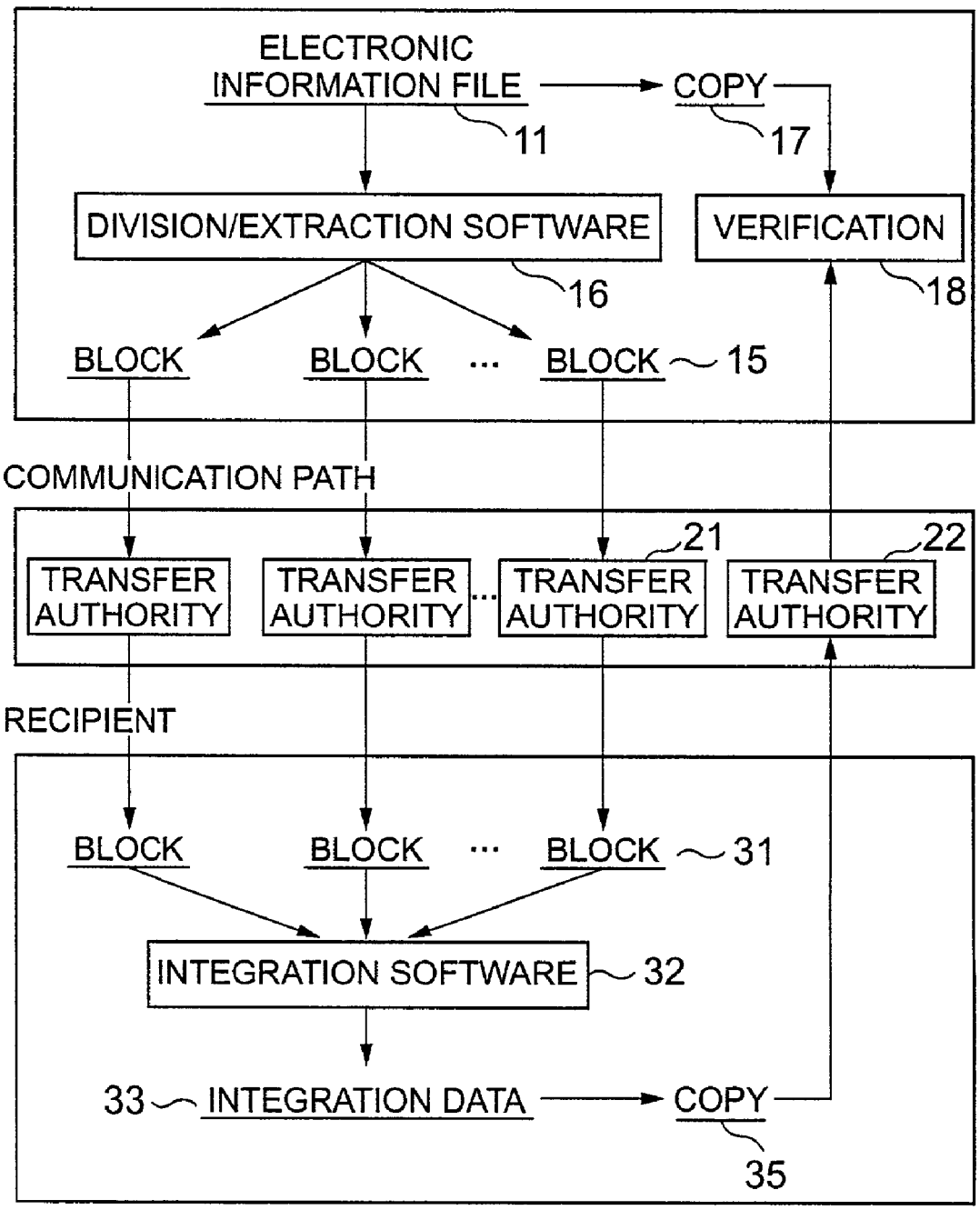
FIG. 6 is a block diagram of a system which uses the present embodiment.

FIG. 5 is a flow diagram illustrating the electronic information security assurance method of the second embodiment provided with means for assuring the originality by an originator of electronic information, and FIG. 6 is a block diagram of the same.

In the following, the embodiment of the present invention which is provided with means for confirming the originality by an originator of electronic information is described with reference to FIGS. 5 and 6.

It is to be noted that, since the security assurance method on which the present embodiment is based is the same as that described hereinabove, in the following description, overlapping description is avoided to such a degree that simplification or omission of a portion does not cause misunderstanding.

When the originator prepares an electronic information file 11 to be sent, he produces a copy 17 from the original (S21) and stores the copy 17 (S22). It is to be noted that the original 11 may be stored in place of the copy 17.

Then, the originator uses division extraction software 16 to work the original 11 of the electronic information file based on division information and extraction information given from an operator or produced partly by the computer to form an information block 15 similarly as in the first embodiment described hereinabove (S23). It is to be noted that, where the original 11 is stored, the copy 17 is selected as the subject of the working.

The information blocks 15 are individually sent to transfer stations 21 similarly as in the first embodiment (S24).

The transfer stations 21 transfer the received information blocks 15 to the designated recipient (S25).

The recipient checks the received information blocks 31 to collect all of the information blocks 31 necessary to restore the object electronic information (S26).

Thereafter, the recipient uses integration software 32 to extract information elements in the information blocks 31 based on the extraction information and the division information included in the acquired division extraction data and re-arrange and integrate the information elements to form an electronic information file 33 (S27).

Further, the recipient produces a copy 35 of the formed electronic information file 33 (S28) and sends back the copy 35 to the originator of the electronic information through a transfer station 22 by a similar method to that in the transmission from the originator (S29). Preferably, a plurality of transfer stations are used for the transfer station 22 in this instance similarly as in the case of the transmission. Further, the copy 35 to be sent back is preferably enciphered to raise the security.

The originator compares the received copy 35 of the restored electronic information file and the copy 17 stored therein with each other to confirm the identity between them (S30).

If the two do not coincide with each other, then since the copy 35 cannot be used as the electronic information, a notification of this is issued (S31). If the recipient does not receive a warning notification from the originator, then it can discriminate that the restoration of the information file has been performed normally (S32).

It is to be noted that, if the two files do not coincide with each other, then since this represents that some trouble has occurred during the communication, a cause must be found out and excluded so that later communication may be performed securely. If the cause cannot be excluded, then preferably the communication means is changed.

Where the originator confirms that restoration of electronic information by the recipient has been performed correctly in this manner, electronic information exchange of very high reliability is realized.

Embodiment 3

The third embodiment is an originality assurance method for electronic information wherein the security assurance method for electronic information of the present invention is provided with means for confirming the originality of each information block to detect abnormality of individual communication paths to further facilitate a countermeasure.

Figure 7:
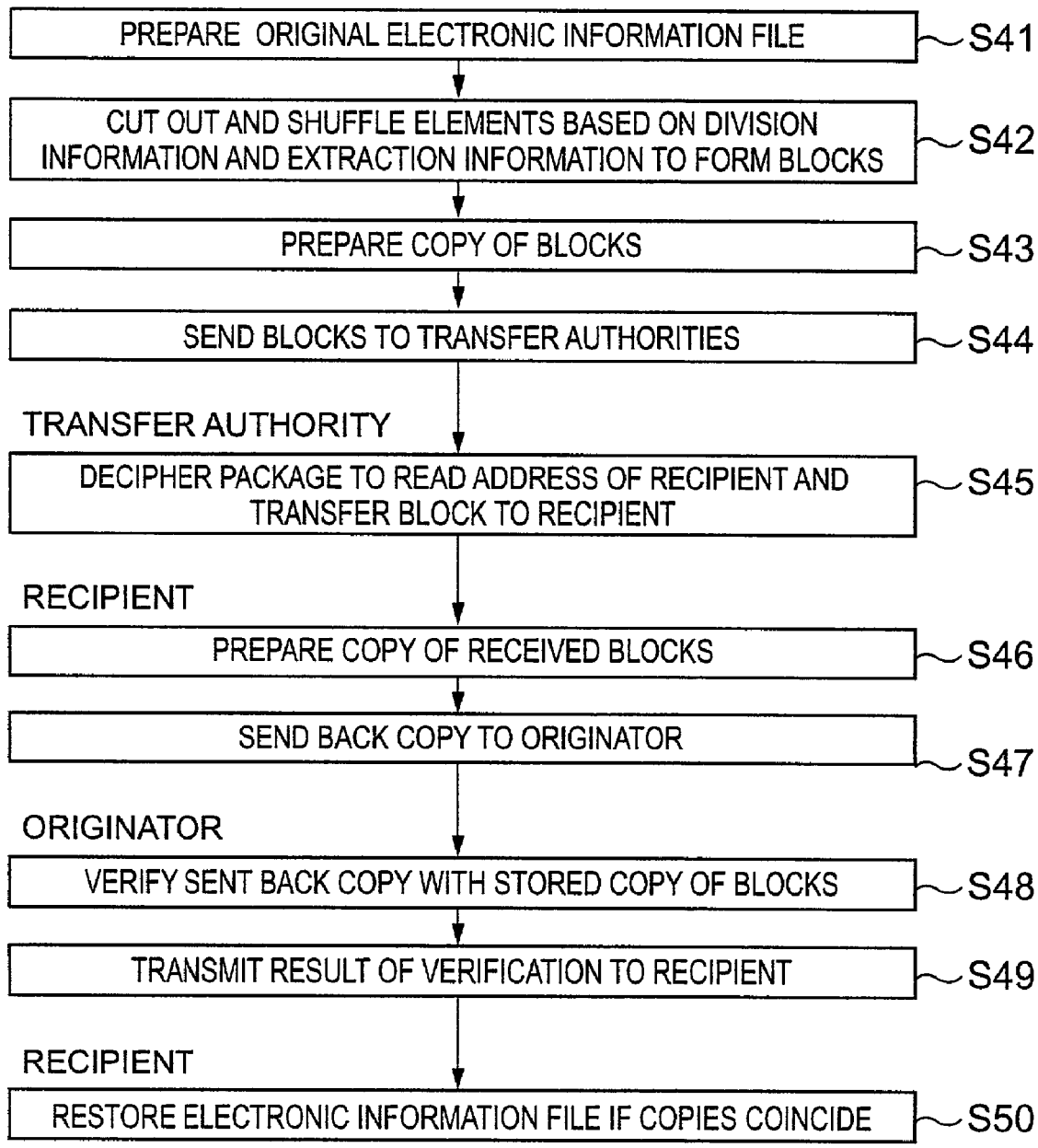
FIG. 7 is a flow diagram illustrating a third embodiment of the security assurance method for electronic information of the present invention.
Figure 8:
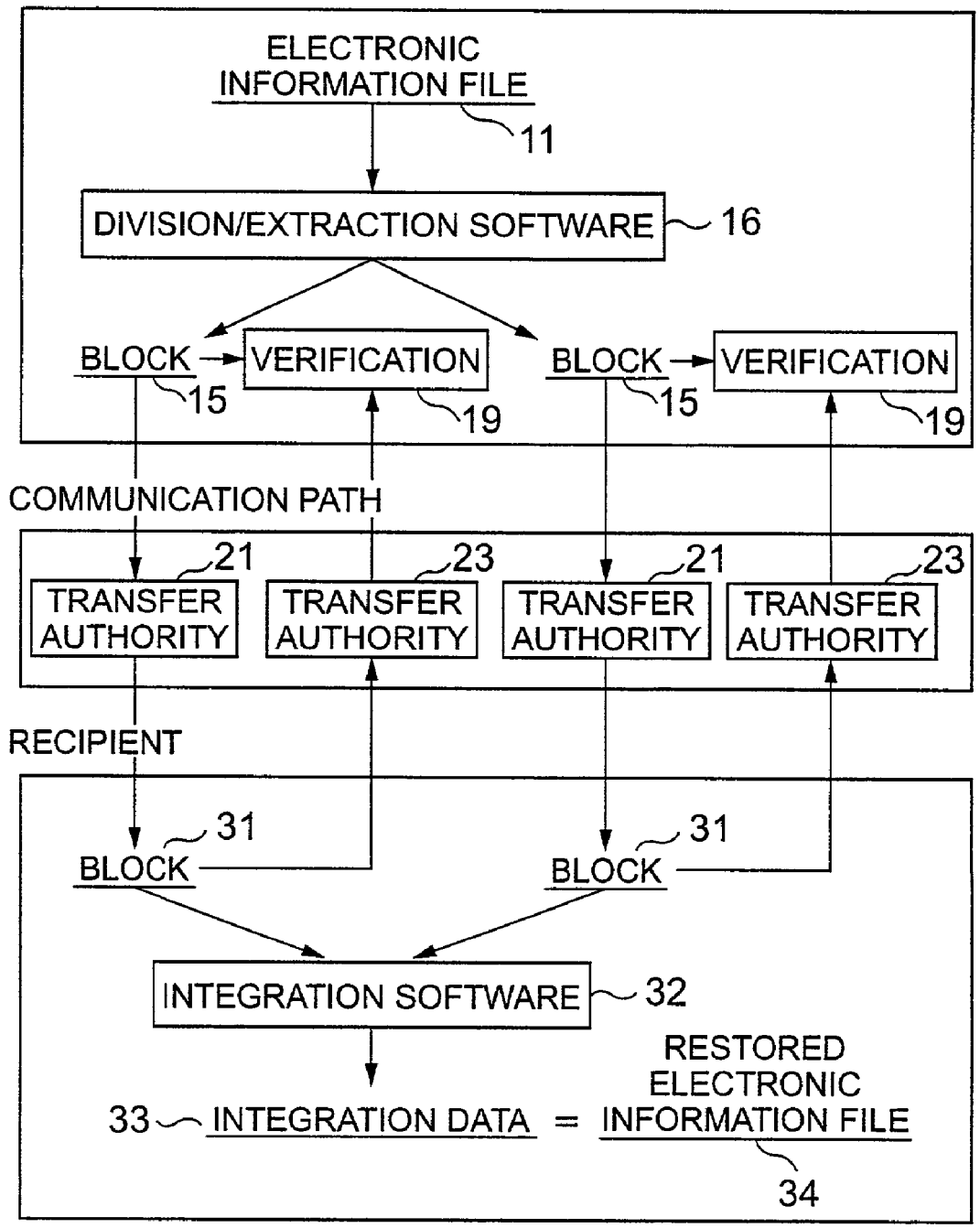
FIG. 8 is a block diagram of a system which uses the present embodiment.

FIG. 7 is a flow diagram illustrating the present embodiment, and FIG. 8 is a block diagram of a system which uses the present embodiment. In the following, the present embodiment is described in detail with reference to FIGS. 7 and 8.

It is to be noted that, also in the present embodiment, overlapping description is avoided by simplifying or omitting the same portion as that described already.

Similarly as in the first embodiment, an originator prepares an electronic information file 11 to be transmitted (S41), and cuts out and shuffles information elements based on division information and extraction information to form information blocks 15 (S42).

Then, the originator produces a copy from the information blocks 15 and stores the copy (S43).

Then, the originator sends packages in which the information blocks 15 are placed to transfer stations 21 by the same method as in the first embodiment (S44). The transfer stations 21 decipher the packages to read the the address of a recipient and transfers the information blocks 15 to the designated recipient again (S45).

The recipient produces a copy of the received information blocks 31 (S46) and sends back the copy to the originator through a transfer station 23 (S47).

The originator verifies the copy of the information blocks 31 sent back thereto and the copy of the original information blocks 15 stored therein with each other to confirm whether or not they coincide with each other (S48).

If the two coincide with each other, then since the information blocks 31 have not been subject to alteration during the communication, they can be used as they are to restore the electronic information.

On the other hand, when the two do not coincide with each other, this represents that a communication path which has been used for transmission of an information block is abnormal. While detection of abnormality is possible in the second embodiment described above, since abnormality is detected in an integrated form of all communication paths, it is difficult to specify a communication route which is abnormal. However, where the method of the present embodiment is used, the abnormal route can be specified simply as described above. Accordingly, also it is easy to take a countermeasure such as removal of the trouble.

A notification of a result of the verification performed by the originator is sent to the recipient (S49).

If the result of the verification proves that the two copies coincide with each other, then the recipient uses integration software 32 to perform restoration of the electronic information file in accordance with a procedure same as that in the first embodiment (S50). Integrated data 33 formed from the information blocks 31 become a file 34 having the same contents as those of the original electronic information file 11.

It is to be noted that, as described hereinabove in connection with the first embodiment, exchange of electronic information may be performed using a communication path in which such transfer stations 21 or 23 as described above are not present.

Further, the transfer stations may store the information blocks transmitted from the transmitting person and then transmit the information blocks in accordance with a request of the recipient. The recipient collects all information blocks and integrates, restores and uses them.

Embodiment 4

According to the fourth embodiment, the security assurance method for electronic information of the present invention is applied to storage of an electronic information file into an external storage apparatus of a computer system.

Figure 9:
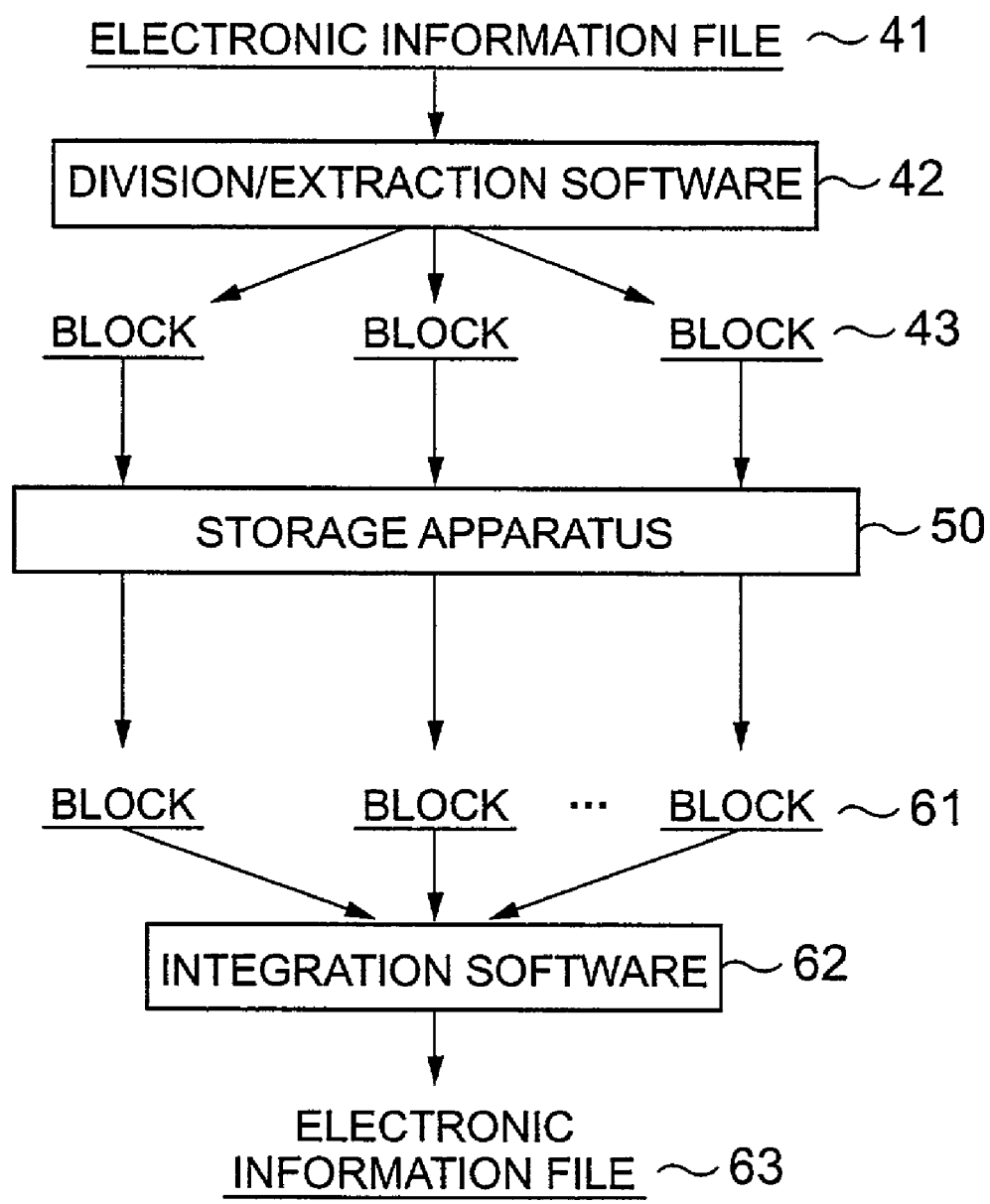
FIG. 9 is a flow diagram illustrating a fourth embodiment of the security assurance method for electronic information of the present invention.

FIG. 9 is a block diagram of a computer system which uses the security assurance method for electronic information of the present embodiment.

In the following, the present embodiment is described with reference to the drawing.

It is to be noted that, since operations and effects of the components of the present embodiment are much common to those of the embodiments described hereinabove, like components having like functions to those in the embodiments described above are denoted by like reference numerals and the description of them is simplified to prevent overlapping description.

An electronic information file 41 prepared by a computer system is divided into information elements and re-arranged by division extraction software 42 so that it is distributed into a plurality of information blocks 43 and then stored into a storage apparatus 50.

When the electronic information file 41 is to be extracted from the storage apparatus 50, information blocks 61 which carry the subject electronic information are all collected and integration software 62 is executed. The integration software 62 extracts division information and extraction information from the information blocks 61, cuts out the information elements in the information blocks 61 based on the information, re-arranges the information elements into the original order and integrates them to produce an electronic information file 63.

Where the electronic information security assurance method of the present embodiment is used, since an electronic information file stored in the storage apparatus 50 is divided in a plurality of information blocks, it is difficult to collect all relating information blocks so that object electronic information may be restored. Further, since information elements in the information blocks are scattered like paper information broken by a shredder, also it is not easy to regenerate part of electronic information.

Leakage of information through accessing from the outside can be prevented in this manner.

It is to be noted that electronic information may be enciphered when it is to be recorded into the storage apparatus 50.

Further, the storage apparatus 50 need not be a single storage apparatus, and electronic information may be stored into storage apparatus separate from each other for individual information blocks.

The electronic information security assurance method of the present embodiment can be applied when an authentication station for which the security is required particularly stores authentication data of the person itself into an external storage apparatus such as a hard disk apparatus or a magnetic tape apparatus.

Embodiment 5

Figure 10:
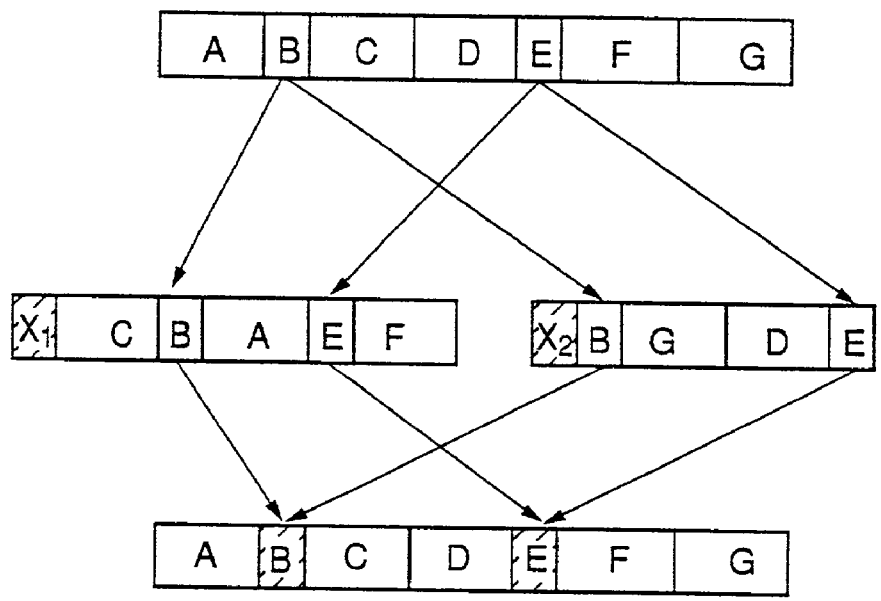
FIG. 10 is a block diagram illustrating a fifth embodiment of the security assurance method for electronic information of the present invention and FIG. 11 is a block diagram illustrating a function of a certification station or certification authority to which the present invention is applied.

In the fifth embodiment, the security assurance method for electronic information of the present invention is provided with means for making use of part of electronic information to secure the originality of the electronic information. FIG. 10 is a block diagram illustrating originality assurance means used in the present embodiment. Since the security assurance method for electronic information on which the present embodiment is based is the same as that described hereinabove, in the following description, overlapping description of the portion is simplified or omitted to prevent overlapping explanation.

FIG. 10 illustrates a case wherein, as an example of form of use of the present invention, an electronic information file is divided into seven information elements and divided into two information blocks.

The order of arrangement of the divided information elements A, B, C, D, E, F and G is changed, and they are grouped suitably so that they are distributed into two information blocks. In this instance, some of the information elements are included commonly as key elements into both of the information blocks. Further, identification regions X1 and X2 in which division information of the information elements, information of the position and the length of each information element in the electronic information file, ID information of the electronic file and so forth are recorded are annexed to the information blocks so that they can be utilized for restoration.

In the example illustrated in FIG. 10, the information elements A, B, C, E and F are distributed in the left information block while the information elements B, D, E and G are distributed in the right information block, and the information elements B and E are included as key elements in both of the information blocks. Since the information elements in each information block are changed in order suitably and are not arranged significantly, even if the information block is read by a third person, contents of the electronic information cannot be read as they are. The information blocks are stored into a storage apparatus or sent to a recipient in accordance with an object.

A user of the electronic information divides the acquired information blocks into the original information elements (A, B, C, . . . ) based on the information recorded in the identification regions X1 and X2, and re-arranges the information elements into a correct order to restore the original electronic information file.

Upon restoration, the information elements B and E which are included in an overlapping relationship in the two information blocks and serve as key elements are detected and verified individually with each other. Thus, if any of the information blocks has been subject to some alteration upon storage or transmission of the information, then since the contents of the overlapping information elements do not coincide with each other, the abnormality can be detected simply.

According to the abnormality detection method used in the present embodiment, since a key element which is a subject of verification cannot be extracted even if an information block is observed by itself, an attack of a third party can be prevented readily. Further, no special additional information is required, and information processing for confirmation of the security is simple.

It is to be noted that naturally the abnormality detection method of the present embodiment may be used together with any other method to improve the security.

Embodiment 6

The sixth embodiment relates to a certification station or a certification authority which applies the security assurance method for electronic information of the present invention to divide and store information into several places and accurately perform various verifications of transaction contents and so forth between the parties concerned.

Figure 11:
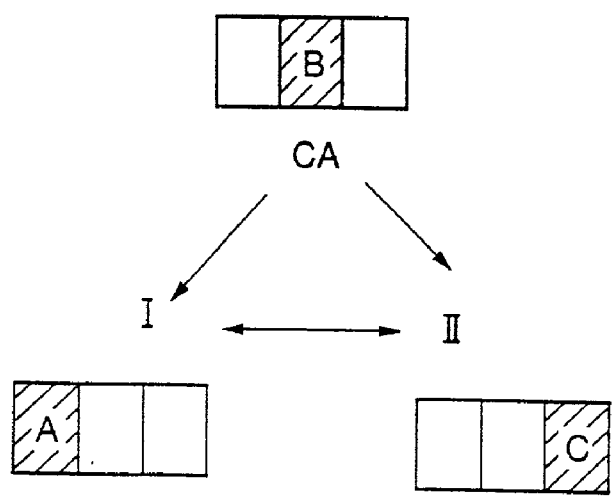

FIG. 11 is a block diagram illustrating a function of a certification station or authority to which the present invention is applied. Since the security assurance method on which the present embodiment is based is the same as that described hereinabove, in the following description, a portion describing the certification authority is described in detail while overlapping description of the other portion is avoided.

A first party I and a second party II convert mutually consented transaction contents into electronic information and store the electronic information. However, since an electronic document leaves no marks even if it is rewritten, the originality of it cannot be secured. Accordingly, in order to minimize the possibility of the future dispute, it is demanded to utilize a certification authority CA, which is a third party organization in which confidence can be placed, to deposit contents of a transaction and, when necessary, to receive a presentation of and confirm the original.

However, where an original is recorded in its full text, a very great storage capacity is required for the certification authority CA. Further, even the certification authority CA may possibly suffer from alteration, and if it is tried to completely secure the genuineness of electronic information, then considerable difficulty is involved in management and administration of the certification authority CA.

The present embodiment is configured by applying the electronic information security assurance method of the present invention and is an authentication system wherein the burden on the certification authority CA is low and the originality of electronic information can be secured with a high degree of certainty.

The parties I and II concerned divide contents of the mutual agreement into information blocks A, B and C based on the method of the embodiments described hereinabove. The first party I concerned stores the first information block A while the second party II concerned stores the second information block C. Further, the third information block B is deposited to the certification authority CA.

In such an authentication system described above, if any of the organizations alters its record, the original cannot be restored. Accordingly, the actually restored electronic information conveys the contents of the original correctly. Therefore, the certification authority CA can secure the originality of the restored electronic information only by recording a very small part of the original. Since the storage capacity to be possessed by the certification authority CA is reduced and the full text of contents of the agreement need not be stored, also the storage responsibility of the certification authority CA is moderated.

INDUSTRIAL APPLICABILITY OF THE INVENTION

As described in detail above, since the security assurance method for electronic information of the present invention divides an electronic information file once into information elements, re-arranges and places the information elements separately into information blocks and then places the information blocks into communication paths or stores the information blocks into a storage apparatus, even if a third party steals an information block being communicated or stored, because small information elements are placed in a scattered form in the information block and contents of the electronic information cannot be read or discriminated, leakage of the secret can be prevented. Further, when the electronic information is to be restored, the originality of the electronic information can be confirmed readily. It is to be added that, where a communication result received over a communication path by a recipient or a restored electronic information file is sent back to its originator and verified with a stored copy, the originality can be secured with a very high degree of reliability.

What is claimed is:

1. A security assurance method for electronic information, comprising:
   an electronic information file that is divided into a plurality of information elements, wherein the divided information elements are selected and combined with their order changed to produce two or more information blocks that each contain two or more of the information elements, wherein when all of the information blocks are not integrated, then all of the information elements are not included;
   division extraction data is produced in which division information of said information elements and formation information of the information blocks are recorded;
   said information blocks and the division extraction data are separated so that all of the information may not gather at a time;
   at least one of said information blocks and the division extraction data that were separated is transmitted to and stored into a certification station while the others are stored or transmitted separately; and
   when the genuineness of said electronic information is to be confirmed, all of the information blocks and the division extraction data including that stored in the certification station are collected and said information blocks are re-divided into the original information elements, re-arranged in the correct order and integrated based on said division extraction data to restore the original electronic information file.

2. The security assurance method for electronic information according to claim 1, wherein said division extraction data is stored or transmitted separately by different means from that with which said information blocks are stored or transmitted.

3. The security assurance method for electronic information according to claim 1, wherein said division extraction data relating to said information elements is annexed for each of said information elements.

4. The security assurance method for electronic information according to claim 1, wherein said information blocks and the division extraction data are stored into an external storage apparatus, and said external storage apparatus is disconnected from the system to keep the electronic information in security therein.

5. The security assurance method for electronic information according to claim 1, wherein a plurality of said information blocks are formed, and said blocks are transmitted in a separate state from each other to a recipient together with said division extraction data.

6. The security assurance method for electronic information according to claim 5, wherein said division extraction data includes data for confirmation of the originality of said electronic information file.

7. The security assurance method for electronic information according to claim 1, wherein one or more index information elements selected from among said information elements is included commonly into a plurality of information blocks, and when the information elements are integrated, the identity of the index information elements included commonly in an overlapping relationship in the different information blocks is verified to confirm the security of the information.

8. The security assurance method for electronic information according to claim 5, wherein at least one of said information blocks and said division extraction data is transmitted to the recipient by second transmission means different from the transmission means for the other electronic information.

9. The security assurance method for electronic information according to claim 8, wherein a transfer station is interposed in said transmission means or said second transmission means, and a block of the information to be sent by said transmission means is accommodated into an information package together with destination information and sent to said transfer station, which in turn transfers the information block to said recipient based on said destination information.

10. The security assurance method for electronic information according to claim 9, wherein said recipient transmits the information block back to a sender for data verification of said transmission means or said second transmission means.

11. The security assurance method for electronic information according to claim 7, comprising:
    determining an abnormality in a corresponding information block when an alteration of a first index information element is detected during verification of the first index information element between two different information blocks.

12. The security assurance method for electronic information according to claim 1, wherein said transmission changes an order of the information blocks, and wherein said information blocks and the division extraction data is enciphered before said transmission or storage.

13. A security assurance method for electronic information, comprising:
    converting mutually consented transaction contents of a first party and a second party into an electronic information file that is divided into a plurality of information elements, wherein the divided information elements are selected and combined with their order changed to produce three or more information blocks each with a plurality of the information elements, wherein when all of the information blocks are not integrated, then all of the information elements are not included;

division extraction data is produced in which division information of said information elements and formation information of the information blocks are recorded;

said information blocks and the division extraction data are separated so that all of the information may not gather at a time;

at least one of said three information blocks that were separated is enciphered and transmitted to and stored into a third party certification station, the first party and the second party, respectively; and when the genuineness of said electronic information is to be confirmed, all of the information blocks and the division extraction data including that stored in the certification station are collected and said information blocks are re-divided into the original information elements, re-arranged in the correct order and integrated based on said division extraction data to restore the original electronic information file.

14. The security assurance method for electronic information according to claim 13, wherein remaining information blocks and remaining division extraction data are stored by the first party and the second party.

* * * * *